United States Patent Office 2,979,471
Patented Apr. 11, 1961

2,979,471

SHAPED ARTICLES OF VINYL CHLORIDE RESIN AND ETHYL CELLULOSE

John J. Sweeney, Saddle Brook, N.J., assignor to The Okonite Company, Passaic, N.J., a corporation of New Jersey No Drawing. Filed Dec. 12, 1958, Ser. No. 779,856

2 Claims. (Cl. 260—17)

My invention is directed to shaped plastic articles of manufacture, the base materials of my improved articles of manufacture consisting of ethyl cellulose and a polymer selected from the group consisting of a homopolymer of vinyl chloride and a copolymer of vinyl chloride and vinyl acetate.

In many applications, the usual shiny, glossy surface finish of articles manufactured from a polymer selected from the group consisting of a homopolymer of vinyl chloride and a copolymer of vinyl chloride and vinyl acetate is objectionable and undesirable. For example, in shoe welting, shoe manufacturers have indicated a preference for a shoe welting which has a dull, non-glossy appearance so as better to conform, in appearance, with the leather used throughout the major portion of the shoe. The shiny, glossy surface finish is due to the heat employed during processing as in extruding, milling, calendering, or molding.

In my attempts to obtain a non-glossy plastic article having as its base material a polymer selected from the group consisting of a homopolymer of vinyl chloride and a copolymer of vinyl chloride and vinyl acetate, I found that the addition to the resin of "flatting" agents, such as those used in paints and lacquers, for example, had no appreciable flatting effect on the resin. These flatting agents were inorganic solids, such as clays, silicas of various types, carbonates, and silicates. I found also that the addition of such materials, aside from failure to produce a non-glossy, dull surface, imparted objectionable characteristics to the finished product.

I have discovered, however, that the addition of ethyl cellulose is very effective in reducing the shiny, glossy surface effects. In fact, I have obtained completely non-glossy surface effects. I have found also that relatively small quantities of the ethyl cellulose are required to achieve the desired non-glossy effect, so that the desirable inherent characteristics of the finished product will be unimpaired.

Any conventional plasticizer may be used, such as monomeric and polymeric esters, epoxidized esters and oils, etc. It is to be understood also that conventional stabilizers, colors, fillers, processing lubricants, and other modifiers may be incorporated when and if desired.

The ethyl cellulose employed may vary widely in both viscosity and in ethoxy content, as I have found that these two parameters are not critical so far as degree of flatting produced is concerned. For example, ethoxy content is essentially 44.5% to 49.0% by weight; viscosity, measured in a 5%-by-weight solution in an 80 : 20 ratio by weight mixture of toluene and ethanol, is essentially 20–300 centipoises at 25° C.

The minimum concentration needed to obtain a marked reduction in gloss is three parts by weight of ethyl cellulose per one hundred parts by weight of the polymer, while a concentration of ten to twenty-five parts by weight of ethyl cellulose per one hundred parts by weight of the polymer results in complete elimination of surface gloss.

In practicing my invention, the polymer and the ethyl cellulose may be dry-blended, or they may be blended in an intensive mixer, such as a Banbury mixer, or mills, for example, to obtain a thorough dispersion of the ethyl cellulose throughout the polymer. After the ethyl cellulose has been thoroughly dispersed throughout the polymer, the resulting mixture, either in dry powder form or already fluxed, is fed into conventional equipment, such as molds, calenders, extruders, etc., in which it is subjected to a sufficiently elevated temperature to reduce the viscosity of the material to a point at which it will flow and conform to the desired shape. The resulting product has a very dull, non-glossy surface finish. It will be appreciated, of course, that the resulting product may be in finished form, or it may be in the nature of rods, tubes, slabs, or sheets in condition for later fabricating into the desired form.

The temperatures employed vary over a considerable range and depend a great deal upon the type and amount of polymer and plasticizer employed. However, in any case, temperatures should not exceed 400° F. to ensure that the ethyl cellulose shall not reach a temperature at which it becomes glossy and, hence, defeat my purpose. For example, when extruding, the temperature employed is preferably between 300° and 400° F., at which temperature range the ethyl cellulose remains dull and non-glossy.

What I claim is:

1. A shaped, dull-surfaced, plastic article of manufacture the base material of which consists of ethyl cellulose and a polymer selected from the group consisting of a homopolymer of vinyl chloride and a copolymer of vinyl chloride and vinyl acetate, the ethyl cellulose ranging in amount from three to twenty-five parts by weight to each one hundred parts by weight of polymer.

2. A shaped, dull-surfaced, plastic article of manufacture the base material of which consists of substantially ten parts by weight of ethyl cellulose to each one hundred parts by weight of a polymer selected from the group consisting of a homopolymer of vinyl chloride and a copolymer of vinyl chloride and vinyl acetate.

References Cited in the file of this patent

UNITED STATES PATENTS

| | | |
|---|---|---|
| 1,902,257 | Moss | Mar. 21, 1933 |
| 2,384,886 | Britton | Sept. 18, 1945 |
| 2,385,920 | Jenkins | Oct. 2, 1945 |
| 2,413,323 | Hills | Dec. 31, 1946 |

FOREIGN PATENTS

| | | |
|---|---|---|
| 308,658 | Great Britain | Sept. 25, 1930 |